(12) United States Patent
Hickson et al.

(10) Patent No.: US 7,249,163 B2
(45) Date of Patent: Jul. 24, 2007

(54) METHOD, APPARATUS, SYSTEM AND COMPUTER PROGRAM FOR REDUCING I/O IN A MESSAGING ENVIRONMENT

(75) Inventors: Andrew I Hickson, West Wellow (GB); David Ware, Downton (GB)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 10/317,651

(22) Filed: Dec. 12, 2002

(65) Prior Publication Data

US 2003/0220968 A1    Nov. 27, 2003

(30) Foreign Application Priority Data

May 27, 2002   (GB)  ................... 0212100.2

(51) Int. Cl.
*G06F 15/167* (2006.01)
*G06F 15/16* (2006.01)
(52) U.S. Cl. .................. 709/213; 709/203; 709/206
(58) Field of Classification Search ............... 709/203, 709/206, 213
See application file for complete search history.

(56) References Cited

U.S. PATENT DOCUMENTS

| | | | | |
|---|---|---|---|---|
| 5,261,089 A | * | 11/1993 | Coleman et al. | 707/8 |
| 5,465,328 A | * | 11/1995 | Dievendorff et al. | 714/15 |
| 5,878,056 A | * | 3/1999 | Black et al. | 714/748 |
| 6,205,464 B1 | * | 3/2001 | Cobb et al. | 718/101 |
| 6,817,018 B1 | * | 11/2004 | Clarke et al. | 719/313 |
| 6,862,595 B1 | * | 3/2005 | Elko et al. | 707/10 |

* cited by examiner

*Primary Examiner*—David Wiley
*Assistant Examiner*—George C. Neurauter, Jr.
(74) *Attorney, Agent, or Firm*—A. Bruce Clay, Esq.; Steven M. Greenberg, Esq.; Carey Rodriguez Greenberg & Paul LLP

(57) ABSTRACT

Requests from a client to put messages into an input queue are intercepted before reaching the input queue. The intercepted requests which refer to a message destined for the server application are established. Information associated with the server application indicates that the server application will process such a message according to a predetermined manner. A request associated with the server application for retrieving such a message is transactional, and the server application uses a one-phase commit for retrieving such a message. Such a message can then be matched with the server application's request such that the server application can retrieve the message. In this way, such messages by-pass the input queue, and are, therefore, not logged, resulting in a reduction of I/O.

22 Claims, 2 Drawing Sheets

METHOD, APPARATUS, SYSTEM AND COMPUTER PROGRAM FOR REDUCING I/O IN A MESSAGING ENVIRONMENT

FIELD OF THE INVENTION

The present invention relates to messaging, and more particularly to the reduction of I/O in a persistent messaging environment.

DESCRIPTION OF THE RELATED ART

Asynchronous transfer of messages between application programs running different data processing systems within a network is well known in the art, and is implemented by a number of commercially available messaging systems. These systems include IBM Corporation's webSphere MQ family of messaging products, which use asynchronous messaging via queues. A sender application program issues a PutMessage command to send (put) a message to a target queue, and a WebSphere MQ queue manager programs handle the complexities of transferring the message from the sender to the target queue, which may be remotely located across a heterogeneous computer network. The target queue is a local input queue for another application program, which retrieves (gets) the message from this input queue by issuing a GetMessage command asynchronously from the send operation. The receiver application program then performs its processing on the message, and may generate further messages. (IBM and WebSphere are trademarks of International Business Machines Corporation).

Messaging products such as WebSphere MQ provide for assured once and once-only delivery of persistent messages even in the event of system or communications failures. This is achieved by not finally deleting a message from storage on a sender system until it is confirmed as safely stored by a receiver system, and by the use of sophisticated recovery facilities.

One key aspect of providing such an assured delivery of messages capability is the maintenance of a log which keeps track of completed message activity on a direct access non-volatile storage device. Every time a persistent change is made to a queue, that change is logged (e.g. if a message is put to a queue, or got from a queue, the operation is recorded). Since the log is non-volatile, it can be used to recover the state of a system (i.e. queue(s) state) in the event of a failure thereof.

Logging however involves forcing data to disk and this is an expensive operation in terms of both time and processing power. FIG. 1 shows how a messaging system typically works according to the prior art. A client 60 puts a request message 5 to an input queue 40 (arrow 1) at queue manager 20. Input queue 40 has changed and so this change is logged to log 30. At this point it is possible to reply to the client 60 (via a return code) that delivery of its message is assured and consequently, even though the message may not yet have arrived at its destination, the client can forget about it (asynchronous messaging).

A server application 10 gets that message 5 off the input queue 40 (arrow 2), processes it, and puts another message (typically a response) to an output queue 50 for retrieval by a client 70 (arrow 3). (Note, clients 60 and 70 may be one and the same. Further the input queue and the output queue may not be located at the same queue manager, contrary to that shown in the figure.) Since input queue 40 has once again changed, as has output queue 50, these changes also need to be logged to log 30. (Note that in the context of a transactional server application only a single log force is required to harden the get/put pair.) At some time later, client 70 may then remove the response message off the output queue 50 (arrow 4) and once again the change in output queue 50 has to be logged. Thus it will be appreciated that three separate log force operations have had to take place in order to guarantee the business process (i.e. the sending of a message; the processing of that message by the server application; and the receiving of a message, produced by the server application, by a client) in the event of a communications failure at any stage in the processing thereof. These are expensive and thus there is a motivation to reduce the number of forces to the log required in such an environment.

SUMMARY OF THE INVENTION

Accordingly, the invention provides a method for reducing I/O in a messaging system comprising: a queue manager for managing at least one input queue; at least one log for logging message activity in the messaging system; at least one client; and a server application separate from the queue manager, the method comprising the steps of: intercepting requests from at least one client to put messages to an input queue, before the messages reach said input queue; establishing those intercepted requests which refer to a message destined for the server application, wherein information associated with the server application indicates that the server application will process such a message according to a predetermined manner, wherein a request associated with the server application for retrieving such a message is transactional and wherein the server application uses a one-phase commit for retrieving such a message; and matching such a message with the server application's request such that the server application can retrieve the message.

Thus I/O is preferably reduced by permitting messages which can be processed according to a predetermined manner by the server application to bypass the input queue and thus not to be logged at this time (previously the messages would be logged when put to the input queue).

In a preferred embodiment, non-established intercepted messages are put to the input queue for retrieval and the message is logged to a log.

According to a preferred embodiment the predetermined manner is that the server application will not, in processing the message from the client, wait for input from another party (e.g. a user). As another example, the server application may guarantee that it won't perform more than a predetermined amount of work in processing the message.

In one embodiment, information is received from the server application indicating whether the server application uses a one-phase commit. This could be received as part of the server application's request. Alternatively this information could be received at setup (e.g. from the server application when it registers to retrieve messages, or be input by a user.) If received at setup, this information can be stored locally and referenced as appropriate.

In another embodiment, it can be inferred from either an action taken by the server application or a property of the server application whether the waiting server application uses a one-phase commit. For example in an XA transactional system, an action might be an XA open and a property of an server application might be that it supports a PRE-PARE verb. In this example, if the server does neither an XA open, nor supports the PREPARE verb, then it is using a one-phase commit.

In one embodiment the information associated with the server application indicating that the server application will process such a message according to a predetermined manner is received as part of the server application's request. (This information could be a flag)

Alternatively the information associated with the server application indicating that the server application will process such a message according to a predetermined manner could be received at setup (e.g. from the server application when it registers to retrieve messages, or be input by a user.) If received at setup, this information can be stored locally and referenced as appropriate.

It will be appreciated that a server application may indicate that it can process messages in the predetermined manner for certain types of request only. Also that a transactional server application may issue some requests which aren't transactional. For example it may retrieve a message transactionally but put a response message to an output queue non transactionally.

According to another aspect, the invention provides an apparatus for reducing I/O in a messaging system comprising: a queue manager for managing at least one input queue; at least one log for logging message activity in the messaging system; at least one client; and a server application separate from the queue manager, the apparatus comprising: means for intercepting requests from at least one client to put messages to an input queue, before the messages reach said input queue; means for establishing those intercepted requests which refer to a message destined for the server application, wherein information associated with the server application indicates that the server application will process such a message according to a predetermined manner, wherein a request associated with the server application for retrieving such a message is transactional and wherein the server application uses a one-phase commit for retrieving such a message; and means for matching such a message with the server application's request such that the server application can retrieve the message.

According to another aspect, the invention provides a system for reducing I/O therein comprising: a queue manager for managing at least one input queue; at least one log for logging message activity in the messaging system; a server application separate from the queue manager; means for intercepting requests from at least one client to put messages to an input queue, before the messages reach said input queue; means for establishing those intercepted requests which refer to a message destined for the server application, wherein information associated with the server application indicates that the server application will process such a message according to a predetermined manner, wherein a request associated with the server application for retrieving such a message is transactional and wherein the server application uses a one-phase commit for retrieving such a message; and means for matching such a message with the server application's request such that the server application can retrieve the message.

It will be appreciated that the invention may be implemented in computer software.

BRIEF DESCRIPTION OF THE DRAWINGS

A preferred embodiment of the present invention will now be described, by way of example only, and with reference to the following drawings.

DETAILED DESCRIPTION

It should be noted that the present invention is applicable to a messaging environment, where the server application may issue requests transactionally (in particular requests to retrieve messages put by a client). This is because the rules for message processing in a completely transactional environment are already well established. Also in the situation where both parties (i.e. the client and the server application) are non-transactional, techniques for avoiding hardening the messages to the log are well known. Further the situation where a request to put a message by the client is transactional and the request to retrieve (get) that message is non-transactional is not particularly useful. This is because typically the get request has to be coordinated with some other activity (such as updating a database or displaying a message to the end user), whilst the put that requests the operation can often occur in isolation. (i.e. an application issuing put:cmit is much more common than one issuing get:cmit).

Figure 1:
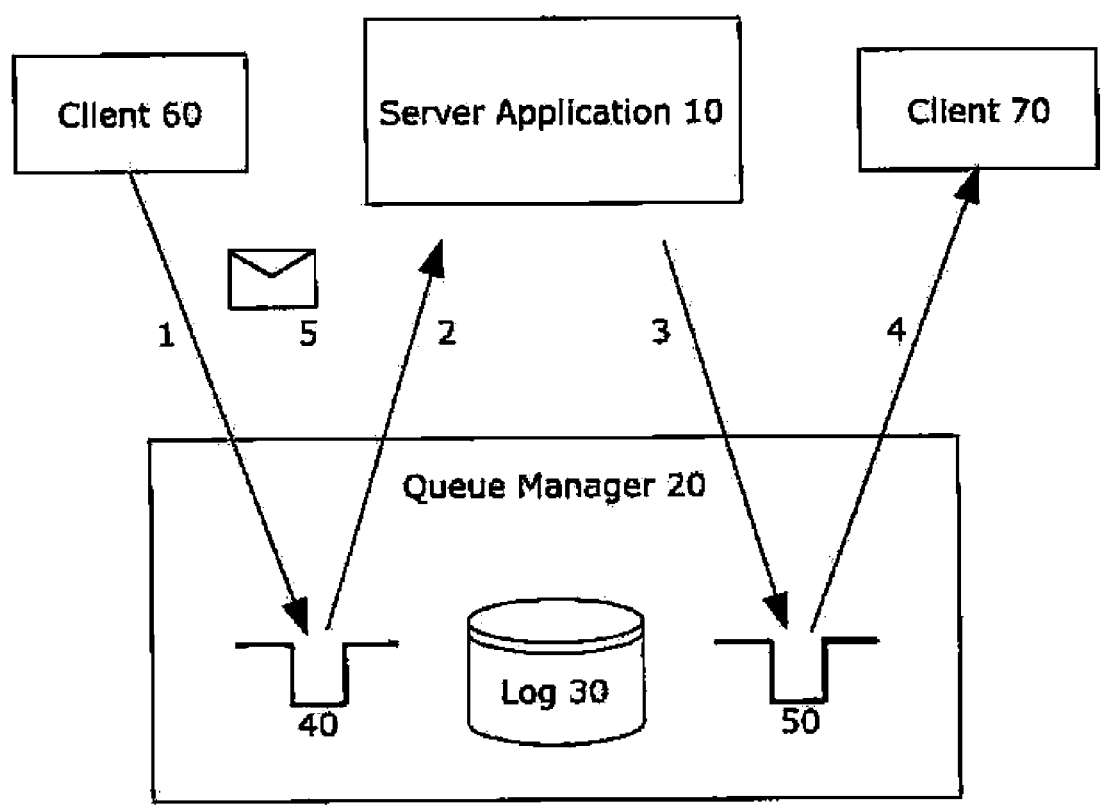
FIG. 1 shows a messaging system according to the prior art.
Figure 2:
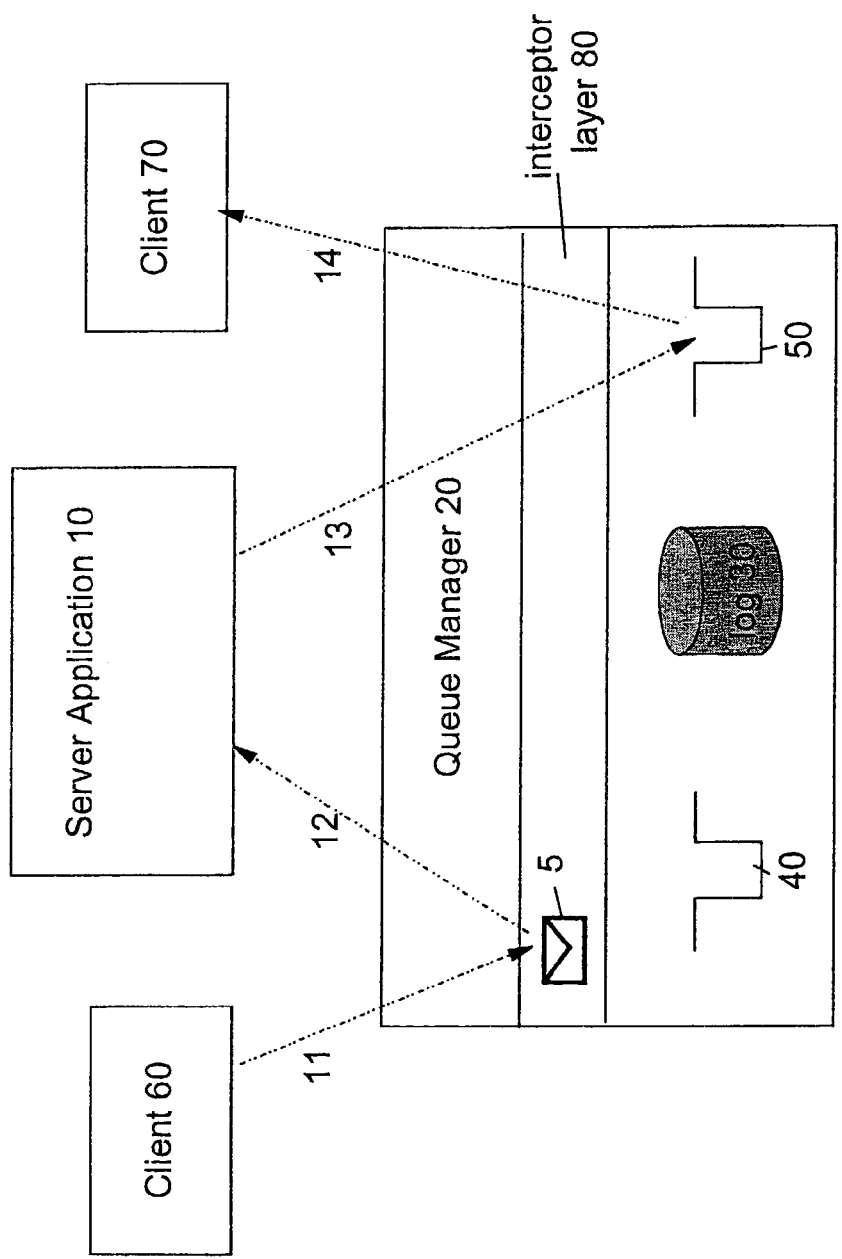
FIG. 2 shows a messaging system according to a preferred embodiment of the present invention.

With reference to FIG. 2, client 60 issues a put message 5 to an input queue (arrow 11). As far as the client 60 is concerned, nothing has changed from the processing undertaken in the prior art (as shown in FIG. 1). According to the preferred embodiment however, some server applications may indicate to queue manager 20 that they will process input messages in such a way as to uphold the principles of asynchronous messaging from the message provider's (client's 60) perspective, and will not, for example, wait for input from a user before putting a message to output queue 50. In other words, a server application may indicate that it will process the message in such a way that a return code to the put request can be synchronised with the processing of the message by the server application.

Get requests promising to process messages in accordance with the principles of asynchronous messaging are, in the preferred embodiment indicated at the queue manager 20 by a flag set on each such get. (It will of course be appreciated that this is not the only way to indicate such requests. For example, the option could be set when the queue was opened by such a server application (when the queue manager looks for a waiting get, it is possible to determine how any such get opened the queue).

Now when the message put by client 60 (arrow 11) arrives at the queue manager 20, it is intercepted by an interceptor layer 80 (e.g. a software application) before it reaches input queue 40. The message is examined by this layer to see whether the optimisation of the present invention can be enabled (e.g. whether the get's flag is set). In the prior art, when a message arrives in the queue manager the queue manager has to try to match the message to a waiting get. The same is also true of the preferred embodiment, however if a waiting get is identified then, the queue manager also checks that get's flag to see whether the get promises to process the message in a manner which allows the optimisation of the present invention.

If there is no such waiting get, processing continues as in the prior art. In other words, the message is put onto input queue 40 and the server application then retrieves the message off this queue at some point and does some processing. A message resulting from this processing is then transferred to output queue 50 for retrieval by a second client 70.

However, if a suitable get request can be identified, then the message is transferred directly to the requesting server application 10 and input queue 40 is bypassed (arrow 12). (The identified waiting get is matched with the message and the message can therefore be retrieved by the server application.) The server application 10 is then bound by the promise it made with regard to processing of the message and should therefore carry out any necessary work and put the resulting message straight to output queue 50 (arrow 13) for retrieval by client 70 (arrow 14). Once the transaction within which the put to the output queue falls is complete, the server application can finalise (commit) the transaction. The commit request issued by the server application is intercepted by the interceptor layer. If the commit was successful, then the client 60 is given a positive reply, if the commit failed or backout was issued (explicitly or implicitly (e.g. server application failure)) then the interceptor layer allows the client 60 to place the message originally put by the client 60 on the original input queue 40 (as in the prior art). Thus the client receives a reply that its message has been delivered successfully in either instance (If the put to the input queue 40 fails then the client will receive a negative reply).

It will be appreciated that the invention is applicable to messaging environments having server applications which are not integral with the queue manager (e.g. those written as plugins to a proprietary messaging solution). In an environment using only integral server applications, the queue manager can process the request internally with a net result that a client's put will effectively be interpreted as a request to put the processed message straight to the output queue (the input queue may therefore not exist).

In the prior art, it was not possible to determine what a non-integral server application would do with a received message. Thus in order to be able to reply in a timely manner to client 60 that delivery of its message was now assured, it was necessary to log the message on the input queue 40 such that a reply could be returned to the client 60 allowing it to forget about its put request. According to a preferred embodiment of the present invention, the interceptor layer 80 has the capacity to determine whether the message will be dealt with appropriately and therefore transferred quickly to output queue 50. Thus there is no longer any need to log the message as it appears on the input queue. (In any case, the message is no longer put to the input queue.) Rather the put and subsequently the get of the message from the output queue need only be logged. Thus only two logging operations are now required as opposed to the three required by the prior art. This is because once the message has been put to the output queue and logged as such, its delivery is now assured and a message can be returned to client 60 that this is the case. Since the server application processed the message quickly, the reply to client 60 regarding the delivery of its message is still timely. If instead the server application 10 replies that there is a problem in processing the message, then this is intercepted by the interceptor layer 80 and the original message 5 is placed on input queue 40 as in the prior art. Consequently this operation does get logged and thus it is still possible to reply to client 60 that delivery of its message is assured.

Because client 60 expects a response of success or failure, the invention is only applicable to a single-phase commit environment where such a response can be guaranteed. In a two-phase commit environment, multiple resource managers are involved in a transaction and thus a transaction may be indoubt (i.e. the final status of the transaction is unknown and depends upon another resource manager.) It is not acceptable to return such a result to client 60, since this breaks the whole principle of asynchronous messaging. Thus in an environment having server applications which might make use of a two-phase commit, a server application's request only has its flag set if it promises to process messages quickly AND if it uses a one-phase commit. The server application could either inform the queue manager of the latter, or in some environments this could be inferred. For example in the XA transaction environment, if a server application does not perform an XA open and the queue manager does not support the PREPARE verb then it can be inferred that the application is using a one-phase commit. The aforementioned will be understood by a person skilled in the art and thus will not be discussed herein in any more detail.

What is claimed is:

1. A method for reducing I/O in a messaging system comprising:
    a queue manager for managing at least one input queue; at least one log for logging message activity in the messaging system; at least one client; and a server application separate from the queue manager, the method comprising the steps of:
    intercepting requests from at least one client to put messages to an input queue, before the messages reach said input queue;
    identifying said intercepted requests which refer to a message destined for the server application, wherein information associated with the server application indicates that the server application will process said message according to a predetermined manner, wherein a request associated with the server application for retrieving said message is transactional and wherein the server application uses a one-phase commit for retrieving said message; and
    matching said message with the server application's request such that the server application can retrieve the message.

2. The method of claim 1, comprising the steps of:
    putting non-identified intercepted messages to the input queue for retrieval; and
    logging the message to a log.

3. The method of claim 1, wherein the predetermined manner is that the server application will not, in processing the message from the client, wait for input from another party.

4. The method of claim 1, comprising the step of:
    inferring whether a one-phase commit is used by at least one of an action taken by the server application and a property of the server application.

5. The method of claim 1, wherein the information associated with the server application indicating that the server application will process said message according to a predetermined manner is received as part of the server application's request.

6. The method of claim 5, wherein the information is a flag.

7. The method of claim 1, wherein the information associated with the server application indicating that the server application will process said message according to a predetermined manner is received at setup.

8. Apparatus for reducing I/O in a messaging system comprising:
    a queue manager for managing at least one input queue; at least one log for logging message activity in the messaging system; at least one client; and a server application separate from the queue manager, the apparatus comprising:
    means for intercepting requests from at least one client to put messages to an input queue, before the messages reach said input queue;

means for identifying said intercepted requests which refer to a message destined for the server application, wherein information associated with the server application indicates that the server application will process said message according to a predetermined manner, wherein a request associated with the server application for retrieving said message is transactional and wherein the server application uses a one-phase commit for retrieving said message; and means for matching said message with the server application's request such that the server application can retrieve the message.

9. The apparatus of claim 8, comprising:

means for putting non-identified intercepted messages to the input queue for retrieval; and means for logging the message to a log.

10. The apparatus of claim 8, wherein the predetermined manner is that the server application will not, in processing the message from the client, wait for input from another party.

11. The apparatus of claim 8, comprising:

means for inferring whether a one-phase commit is used by at least one of an action taken by the server application and a property of the server application.

12. The apparatus of claim 8, wherein the information associated with the server application indicating that the server application will process said message according to a predetermined manner is received as part of the server application's request.

13. The apparatus of claim 12, wherein the information is a flag.

14. The apparatus of claim 8, wherein the information associated with the server application indicating that the server application will process said message according to a predetermined manner is received at setup.

15. A system for reducing I/O therein comprising:

a queue manager for managing at least one input queue;

at least one log for logging message activity in the messaging system;

a server application separate from the queue manager;

means for intercepting requests from at least one client to put messages to an input queue, before the messages reach said input queue;

means for identifying said intercepted requests which refer to a message destined for the server application, wherein information associated with the server application indicates that the server application will process said message according to a predetermined manner, wherein a request associated with the server application for retrieving said message is transactional and wherein the server application uses a one-phase commit for retrieving said message; and means for matching said message with the server application's request such that the server application can retrieve the message.

16. The system of claim 15, comprising:

means for putting non-identified intercepted messages to the input queue for retrieval; and means for logging the message to a log.

17. The system of claim 15, wherein the predetermined manner is that the server application will not, in processing the message from the client, wait for input from another party.

18. The system of claim 15, comprising:

means for inferring whether a one-phase commit is used by at least one of an action taken by the server application and a property of the server application.

19. The system of claim 15, wherein the information associated with the server application indicating that the server application will process said message according to a predetermined manner is received as part of the server application's request.

20. The system of claim 19, wherein the information is a flag.

21. The system of claim 15, wherein the information associated with the server application indicating that the server application will process said message according to a predetermined manner is received at setup.

22. A computer program comprising program code means adapted to perform the method of claim 1 when said program is run on a computer.

* * * * *